(12) United States Patent
Nickum (10) Patent No.: US 10,352,506 B1
(45) Date of Patent: Jul. 16, 2019

(54) LED RETROFIT SYSTEMS

(71) Applicant: Kenneth Nickum, Mesa, AZ (US)

(72) Inventor: Kenneth Nickum, Mesa, AZ (US)

(73) Assignee: Kenneth Nickum, Mesa, AZ (US)

( * ) Notice: Subject to any disclaimer, the term of this patent is extended or adjusted under 35 U.S.C. 154(b) by 0 days.

(21) Appl. No.: 15/253,706

(22) Filed: Aug. 31, 2016

Related U.S. Application Data

(60) Provisional application No. 62/269,895, filed on Dec. 18, 2015, provisional application No. 62/212,553, filed on Aug. 31, 2015.

(51) Int. Cl.
| | |
|---|---|
| *F21K 9/23* | (2016.01) |
| *F21V 5/00* | (2018.01) |
| *F21S 2/00* | (2016.01) |
| *H05B 41/38* | (2006.01) |
| *F21V 17/12* | (2006.01) |
| *F21Y 115/10* | (2016.01) |

(52) U.S. Cl.
CPC ............... *F21K 9/23* (2016.08); *F21S 2/005* (2013.01); *F21V 5/007* (2013.01); *F21V 17/12* (2013.01); *H05B 41/38* (2013.01); *F21Y 2115/10* (2016.08)

(58) Field of Classification Search
CPC . F21K 9/23; F21V 17/12; F21V 5/007; H05B 41/38; F21S 2/005
See application file for complete search history.

(56) References Cited

U.S. PATENT DOCUMENTS

| | | | |
|---|---|---|---|
| 8,858,016 B2 | 10/2014 | Strelchuk | |
| 2008/0278955 A1 | 11/2008 | Boyer | |
| 2012/0051048 A1 | 3/2012 | Smit et al. | |
| 2012/0113628 A1 | 5/2012 | Burrow et al. | |
| 2012/0155080 A1* | 6/2012 | Schupple | ............ F21V 19/0055 362/235 |
| 2013/0033861 A1 | 2/2013 | Orton | |
| 2015/0016108 A1 | 1/2015 | Howe | |
| 2016/0265726 A1* | 9/2016 | Henrie | ................ F21V 19/0055 |

FOREIGN PATENT DOCUMENTS

GB     2486372 A     6/2012

* cited by examiner

*Primary Examiner* — David V Bruce
(74) *Attorney, Agent, or Firm* — Jennings, Strouss & Salmon, PLC; Michael K. Kelly; Daniel R. Pote (57) ABSTRACT

LED retrofitting system for retrofitting High Intensity Discharge Lighting (HID) fixtures with Light Emitting Diode (LED) arrays and the method for retrofitting.

11 Claims, 6 Drawing Sheets

LED RETROFIT SYSTEMS

CROSS-REFERENCE TO RELATED APPLICATION

The present application is related to and claims priority from prior provisional application Ser. No. 62/212,553, filed Aug. 31, 2015, entitled "LED RETROFITTING SYSTEMS"; and, this application is related to and claims priority from prior provisional application Ser. No. 62/269,895, filed Dec. 18, 2015, entitled "LED RETROFITTING SYSTEMS", the contents of all of which are incorporated herein by this reference and are not admitted to be prior art with respect to the present invention by the mention in this cross-reference section.

BACKGROUND

This invention relates to providing a system for retrofitting of High Intensity Discharge (HID) lighting with the more efficient and longer lasting Light Emitting Diode (LED) lighting. More particularly this invention relates to providing a system for easily and efficiently retrofitting HID light fixtures with the parts which allow use of LED lights.

OBJECTS AND FEATURES OF THE INVENTION

A primary object and feature of the present invention is to provide a system overcoming the above-mentioned problem.

It is a further object and feature of the present invention to provide such a system that is efficient and cost effective.

It is a further object and feature of the present invention to provide such a system that allows a user to convert an HID fixture into an LED fixture that is compatible with any size, shape or brand of HID fixture.

It is a further object and feature of the present invention to provide such a system that reduces down time of the lighting fixtures while in the retrofitting process.

It is a further object and feature of the present invention to provide such a system that allows for use of existing brackets within the fixture for use with the LED power source, allows for customization of the positioning of the Power source and allows for customization of the LED array depending on the lighting needs of the user.

It is a further object and feature of the present invention to provide such a system that allows for the recycling of the unused parts of the HID fixtures to allow for a reduction in the overall cost of retrofitting.

A further primary object and feature of the present invention is to provide such a system that is efficient, inexpensive, and handy. Other objects and features of this invention will become apparent with reference to the following descriptions.

SUMMARY OF THE INVENTION

In accordance with a preferred embodiment hereof, this invention provides a method, relating to retrofitting high-intensity-discharge lighting fixtures with light-emitting-diode lighting modules, comprising the steps of: identifying at least one high-intensity-discharge lighting fixture to be retrofitted with light-emitting-diode lighting modules; wherein such at least one high-intensity-discharge lighting fixture comprises at least one enclosure base and at least one enclosure lid structured and arranged to close together and seal against weather to protect components of at least one high-intensity-discharge lighting fixture, and at least one lens mount structured and arranged to mount at least one lens of such at least one high-intensity-discharge lighting fixture in such at least one enclosure lid; measuring such at least one lens and at least one lens opening of at least one high-intensity-discharge lighting fixture; designing at least one layout of at least one light-emitting-diode array to fit within the measured size of such at least one lens opening; cutting at least one support to match the size of such at least one lens; wherein, once cut, such at least one support is capable of mounting to such at least one enclosure lid using such at least one lens mount; mounting such at least one light-emitting-diode array to such at least one support following the design of such at least one layout; wiring such at least one light-emitting-diode array to connect with at least one power converter structured and arranged to convert power from at least one input power of such at least one high-intensity-discharge lighting fixture to power requirements of such at least one light-emitting-diode array; disconnecting and removing components of such at least one high-intensity-discharge lighting fixture; mounting such at least one support to such at least one enclosure lid with such at least one lens mount; connecting power to such at least one light-emitting-diode array through such at least one power converter from at least one input power of such at least one high-intensity-discharge lighting fixture; closing such at least one enclosure lid with such at least one enclosure base; wherein such at least one high-intensity-discharge lighting fixture is retrofitted to become at least one light-emitting-diode lighting fixture.

Moreover, it provides such a method wherein the step of mounting such at least one light-emitting-diode array comprises the steps of: mounting at least one circuit board having at least one light-emitting-diode directly to such at least one support; and mounting at least one light-emitting-diode lens directly to such at least one support.

Additionally, it provides such a method wherein the step of mounting such at least one light-emitting-diode lens comprises the steps of: enclosing such at least one circuit board and such at least one light-emitting-diode with such at least one light-emitting-diode lens and such at least one support; and sealing such at least one light-emitting-diode lens with such at least one support against weather.

Also, it provides such a method further comprising the step of mounting such at least one power converter to such at least one support. In addition, it provides such a method further comprising the step of mounting such at least one power converter to such at least one enclosure base. And, it provides such a method further comprising the step recycling such at least one components of such at least one high-intensity-discharge lighting fixture removed in the step of disconnecting and removing components. Further, it provides such a method wherein the step of disconnecting and removing components comprises the step of removing such at least one lens. Even further, it provides such a method further comprising the step of: ascertaining at least one lighting requirement; wherein the step of designing at least one layout incorporates such at least one lighting requirement.

Moreover, it provides such a method: wherein the step of identifying at least one high-intensity-discharge lighting fixture comprises identifying multiple structural groupings of such at least one high-intensity-discharge lighting fixtures; wherein each group of such at least one high-intensity-discharge lighting fixtures requires a different design of such at least one layout; wherein the steps of measuring such at least one lens and at least one lens opening, and designing at least one layout comprise the step of creating such at least one layout; wherein the steps of cutting at least one support, mounting such at least one light-emitting-diode array, and wiring such at least one light-emitting-diode array comprise the step of manufacturing the light-emitting-diode lighting modules; wherein the steps of disconnecting and removing components, mounting such at least one support, connecting power, and closing such at least one enclosure lid comprise the step of installing the light-emitting-diode lighting modules; wherein the steps of creating such at least one layout, manufacturing the light-emitting-diode lighting modules, and installing the light-emitting-diode lighting modules process steps on each group of such at least one high-intensity-discharge lighting fixtures in stages, so that a preceding step processes a next group while a following step processes a group previously completed by the preceding step; whereby each group is not processed through each of the steps of creating, manufacturing, and installing before the next group begins processing.

In accordance with another preferred embodiment hereof, this invention provides a system, relating to retrofitting high-intensity-discharge lighting fixtures with light-emitting-diode lighting modules, comprising: at least one light-emitting-diode array structured and arranged to illuminate a designated area when mounted in at least one lighting fixture enclosure; wherein such at least one lighting fixture enclosure comprises at least one enclosure base and at least one enclosure lid structured and arranged to close together and seal against weather to protect components of at least one high-intensity-discharge lighting fixture, and at least one lens mount structured and arranged to mount at least one lens of such at least one high-intensity-discharge lighting fixture in such at least one enclosure lid; and at least one support structured and arranged to support at least one light-emitting-diode array; wherein such at least one support comprises at least one enclosure mount structured and arranged to mount in such at least one lighting fixture enclosure; and wherein such at least one enclosure mount engages with such at least one lens mount in such at least one lighting fixture enclosure to mount such at least one support in such at least one lighting fixture enclosure.

Additionally, it provides such a system further comprising at least one power converter structured and arranged to convert power from at least one input power of such at least one high-intensity-discharge lighting fixture to power requirements of such at least one light-emitting-diode array. Also, it provides such a system wherein such at least one power converter mounts to such at least one support. In addition, it provides such a system wherein such at least one power converter mounts to such at least one enclosure base. And, it provides such a system wherein such at least one light-emitting-diode array comprises at least one light-emitting-diode structured and arranged to emit light when connected to power; at least one circuit board structured and arranged to connect each such at least one light-emitting-diode to power; and at least one light-emitting-diode lens structured and arranged to direct light from such at least one light-emitting-diode.

Further, it provides such a system wherein such at least one circuit board and such at least one light-emitting-diode lens mount directly to such at least one support. Even further, it provides such a system wherein such at least one light-emitting-diode lens and such at least one support: enclose such at least one circuit board and such at least one light-emitting-diode; and seal together against weather.

Even further, it provides such a system wherein such at least one light-emitting-diode array further comprises at least one seal structured and arranged to seal such at least one light-emitting-diode lens with such at least one support. Even further, it provides such a system wherein such at least one light-emitting-diode lens comprises at least one wire accommodator structured and arranged to accommodate clearance space between such at least one circuit board and such at least one light-emitting-diode lens to allow at least one power wire to connect to such at least one circuit board.

Even further, it provides such a system wherein such at least one light-emitting-diode lens comprises at least one mount screw accommodator structured and arranged to accommodate clearance space between such at least one circuit board and such at least one light-emitting-diode lens to allow at least one circuit board mount screw to protrude above such at least one circuit board. Even further, it provides such a system further comprising such at least one lighting fixture enclosure.

This invention provides for each and every novel feature, element, combination, step and/or method disclosed or suggested by this patent application.

DETAILED DESCRIPTION OF THE BEST MODES AND PREFERRED EMBODIMENTS OF THE INVENTION

Figure 1A:
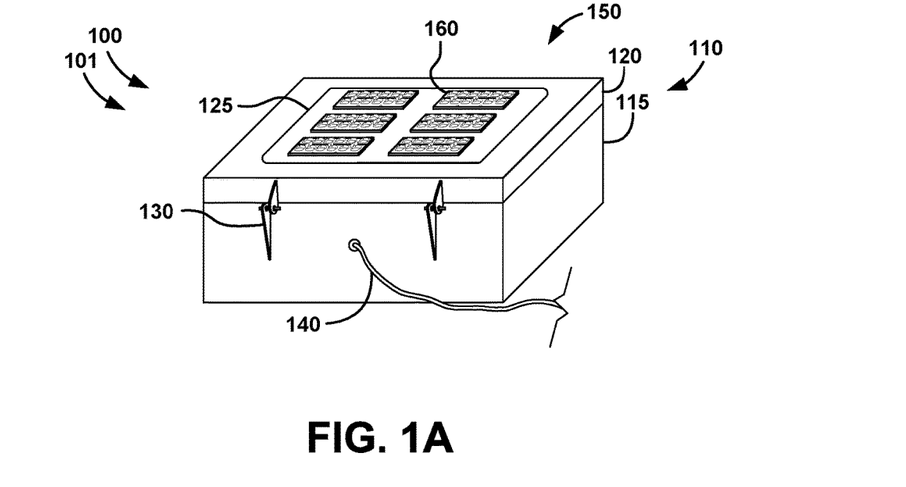
FIGS. 1A and 1B show a bottom perspective view illustrating a light-emitting diode (LED) lighting fixture according to a preferred embodiment of the present invention.
Figure 1B:
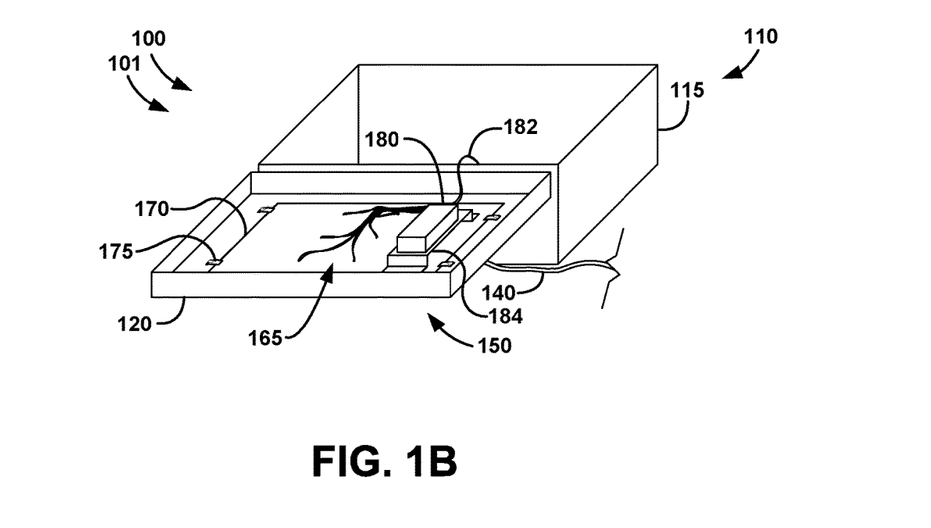
Figure 2A:
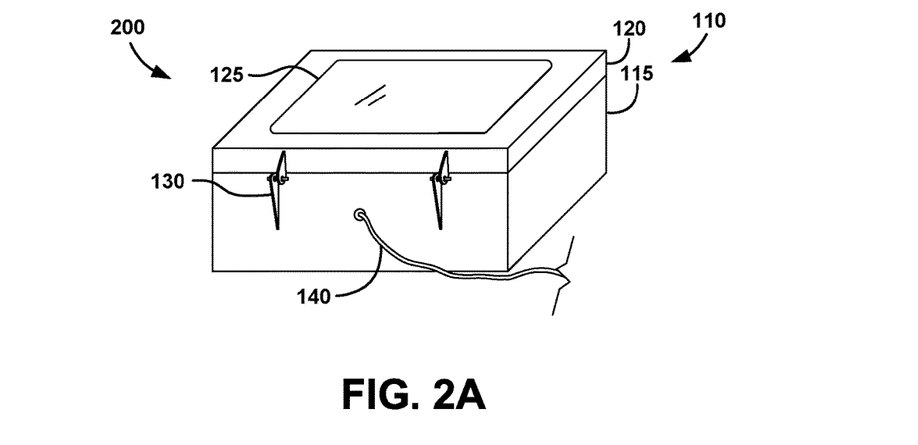
FIGS. 2A and 2B show a bottom perspective view illustrating a high-intensity discharge (HID) lighting fixture according to the preferred embodiment of FIG. 1.
Figure 2B:
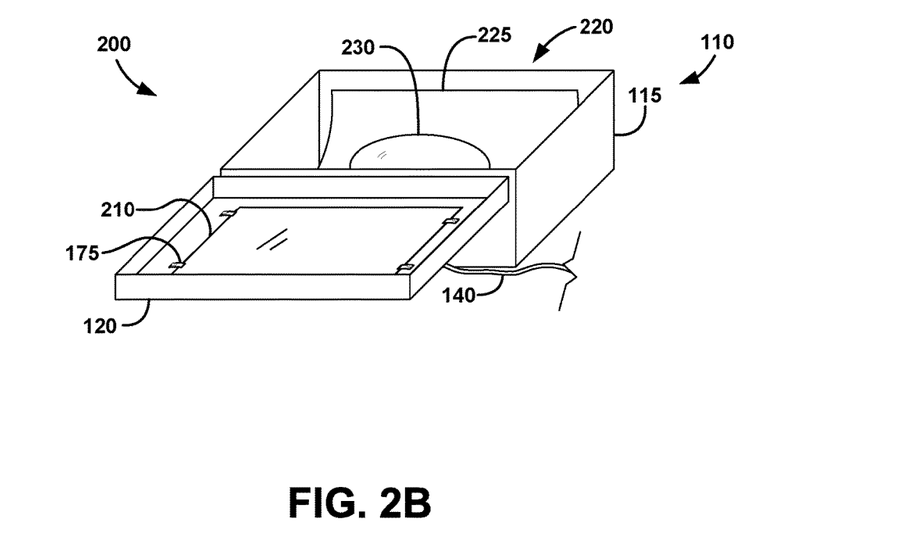

FIGS. 1A and 1B show a bottom perspective view illustrating a light-emitting diode (LED) lighting fixture 101 according to a preferred embodiment of the present invention. FIGS. 2A and 2B show a bottom perspective view illustrating a high-intensity discharge (HID) lighting fixture 200 according to the preferred embodiment of FIG. 1.

HID lighting fixture 200 preferably comprises an outdoor light, such as, for example, a street lamp, parking lot light, walkway light, etc. HID lighting fixture 200 preferably comprises a lighting fixture enclosure 110, preferably comprising at least one opening enclosure, as shown. Lighting fixture enclosure 110 preferably mounts on a structure, such as, for example, a lamp post, a building façade, etc, and is typically exposed to the elements. Lighting fixture enclosure 110 preferably comprises at least one lid 120 and at least one base 115, as shown. Lid 120 and base 115 preferably are attached by at least one hinge 130, preferably at least one pin hinge, as shown. Lighting fixture enclosure 110 preferably comprises at least one opening 125, as shown.

HID lighting fixture 200 preferably further comprises HID components 220, as shown. HID components 220 preferably comprise, as shown, at least one HID bulb 230, at least one reflector 225 and at least one HID driver (not shown). HID components 220 preferably convert incoming power (through power cord 140) into light through high intensity discharge of the electricity.

HID lighting fixture 200 preferably further comprises at least one lighting fixture lens 210, as shown. Lighting fixture lens 210 preferably is at least partially transparent to light, as shown, and preferably directs light produced in HID lighting fixture 200, preferably in a diffused pattern to illuminate a large area. Lighting fixture lens 210 preferably fills opening 125, as shown. Lighting fixture lens 210 preferably is larger than opening 125, as shown. Lighting fixture lens 210 preferably mounts to lid 120 with at least one mount 175, preferably at least one clip mount, as shown (at least herein embodying at least one lens mount structured and arranged to mount at least one lens of such at least one high-intensity-discharge lighting fixture in such at least one enclosure lid). Lighting fixture lens 210 preferably comprises a planar periphery, as shown, preferably utilized for mounting. While lighting fixture lens 210 is rendered, for simplicity, as flat and rectangular, one of ordinary skill in the art will appreciate that variety among HID lighting fixtures may include other shaped lenses, such as, for example, round, curved, recessed, hemispherical, etc. Such variety is, in part, a primary complication inherent in retrofitting HID lighting fixtures with LED light sources. With a wide variety of possible shapes, inherently comes a wide variety of mounting points, as well as diffusion patterns in the light. Likewise such variations lead to a variety of lighting fixture enclosures. And while Applicant has shown a simple enclosure structure using a rectangular prism shape, Applicant presents that the invention disclosed herein may be readily adapted to the variations found in lighting fixture enclosures and openings therein. For simplification of disclosure, FIGS. 1A and 1B show a preferred adaptation of the present invention to HID lighting fixture 200.

LED retrofit system 100 preferably comprises LED lighting fixture 101, as shown (This arrangement at least embodies herein at least one system relating to retrofitting high-intensity-discharge lighting fixtures with light-emitting-diode lighting modules comprising at least one light-emitting-diode array structured and arranged to illuminate a designated area when mounted in at least one lighting fixture enclosure). LED lighting fixture 101 preferably comprises lighting fixture enclosure 110, having lid 120, base 115 and power cord 140, as shown (at least herein embodying wherein such at least one lighting fixture enclosure comprises at least one enclosure base and at least one enclosure lid structured and arranged to close together and seal against weather to protect components of at least one high-intensity-discharge lighting fixture). Lighting fixture lens 210 and HID components 220 of HID lighting fixture 200 are preferably removed from lighting fixture enclosure 110 and lighting fixture enclosure 110 is preferably reused, as shown, including power cord 140, in LED lighting fixture 101.

LED lighting fixture 101 preferably further comprises at least one LED lighting module 150, as shown. LED lighting module 150 preferably comprises, as shown, a periphery matching lighting fixture lens 210, preferably to enable LED lighting module 150 to mount to lighting fixture enclosure 110 using mount 175 (at least herein embodying wherein such at least one support comprises at least one enclosure mount structured and arranged to mount in such at least one lighting fixture enclosure; and at least herein embodying wherein such at least one enclosure mount engages with such at least one lens mount in such at least one lighting fixture enclosure to mount such at least one support in such at least one lighting fixture enclosure). LED lighting module 150 preferably comprises at least one LED support 170, at least one LED array module 160 and at least one power converter 180, as shown. LED support 170 preferably comprises the periphery matching lighting fixture lens 210, as shown. LED support 170 preferably spans opening 125, as shown. LED array module 160 preferably mounts to LED support 170, as shown (at least herein embodying at least one support structured and arranged to support at least one light-emitting-diode array). Multiple LED array modules 160 are preferably arranged to fit within opening 125, as shown.

Power converter 180 preferably mounts to backside of LED support 170, as shown, alternately preferably to mount points within lighting fixture enclosure 110 previously used to mount HID components 220 (at least herein embodying wherein such at least one power converter mounts to such at least one support; and at least herein embodying wherein such at least one power converter mounts to such at least one enclosure base). Power converter 180 preferably mounts with at least one offset mount 184, as shown. Offset mount 184 preferably spaces power converter away from LED support 170, preferably to permit air flow around power converter 180 for heat dispersion, as shown. Power converter 180 preferably connects inside lighting fixture enclosure 110 to power coming through power cord 140, as shown, using wiring 182. Power converter 180 preferably converts the input power to the appropriate power for LED array module 160. Power converter 180 (at least embodying herein at least one power converter structured and arranged to convert power from at least one input power of such at least one high-intensity-discharge lighting fixture to power requirements of such at least one light-emitting-diode array) preferably electrically connects to each LED array module 160 through wiring 165, as shown.

In a preferred embodiment, LED support 170 preferably comprises a planar plate which fits in lighting fixture enclosure 110 covering opening 125, similar to lighting fixture lens 210. Alternately preferably, lighting fixture lens 210 may be replaced over LED support 170 to maintain the outward appearance of the lighting fixture. To accommodate lighting fixture lens 210, either lighting fixture lens 210 needs to be curved or offset in nature, sufficient to permit spacing for LED array modules 160, or LED support is recessed sufficient to permit the space. Applicant recognizes that no modification need be made to lighting fixture lens 210, should it be desired to maintain the outward appearance of the lighting fixture and disguise the retrofit of the lighting fixture.

Figure 8:
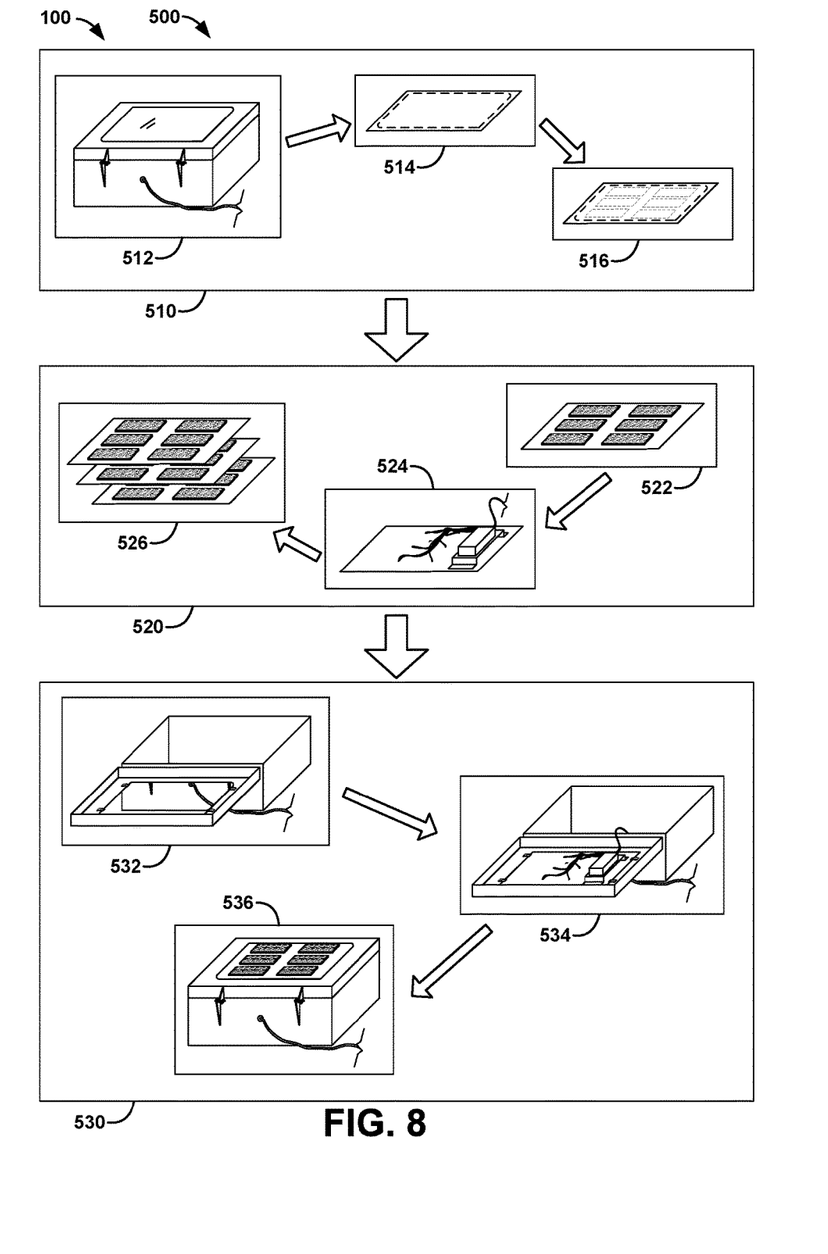
FIG. 8 shows a diagrammatic view illustrating a retrofit method of the high-intensity discharge (HID) lighting fixture of FIGS. 2A and 2B into the light-emitting diode (LED) lighting fixture of FIGS. 1A and 1B according to a preferred embodiment of the present invention.

Further, Applicant notes that since the retrofit of HID lighting fixture 200 to LED lighting fixture 101 is achieved with LED lighting module 150, the retrofitting process may be carried out in situ, saving both retrofit time and downtime of the lighting fixture (see also FIG. 8).

Figure 3:
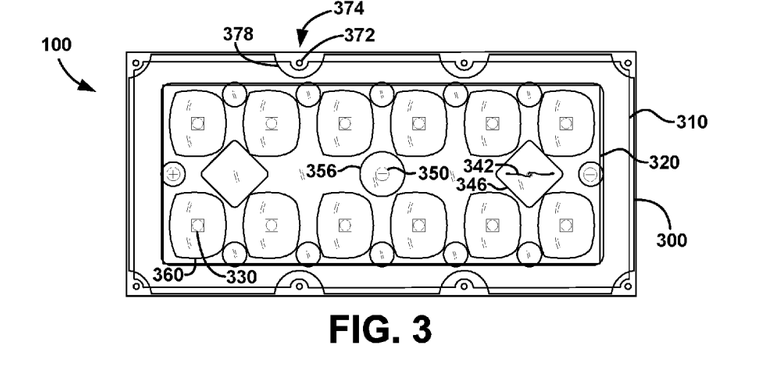
FIG. 3 shows a plan view, illustrating a LED array module, according to the preferred embodiment of FIG. 2.
Figure 4:
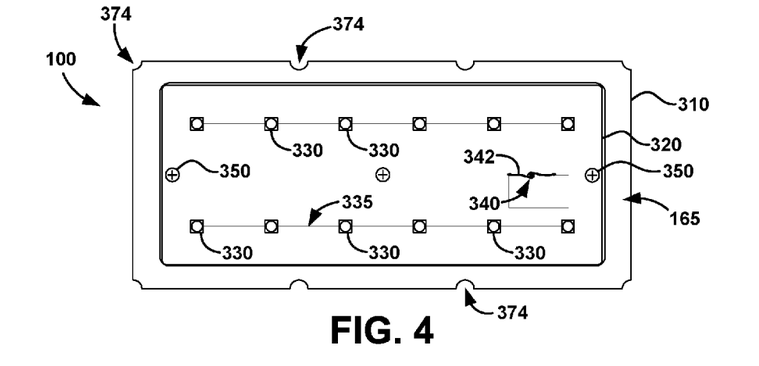
FIG. 4 shows a plan view of an LED array according to the preferred embodiment of FIG. 3.
Figure 5:
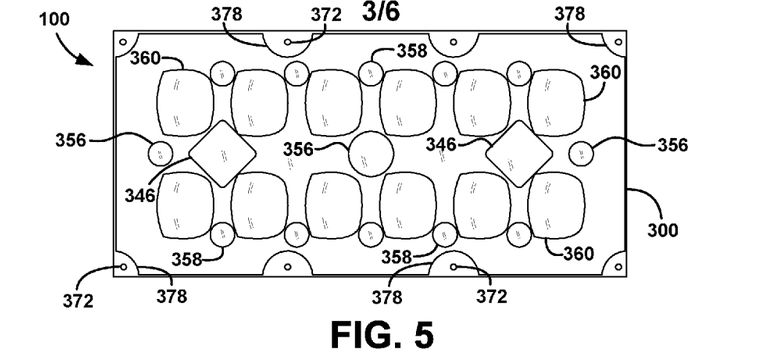
FIG. 5 shows a plan view of an LED array lens according to the preferred embodiment of FIG. 3.
Figure 6:
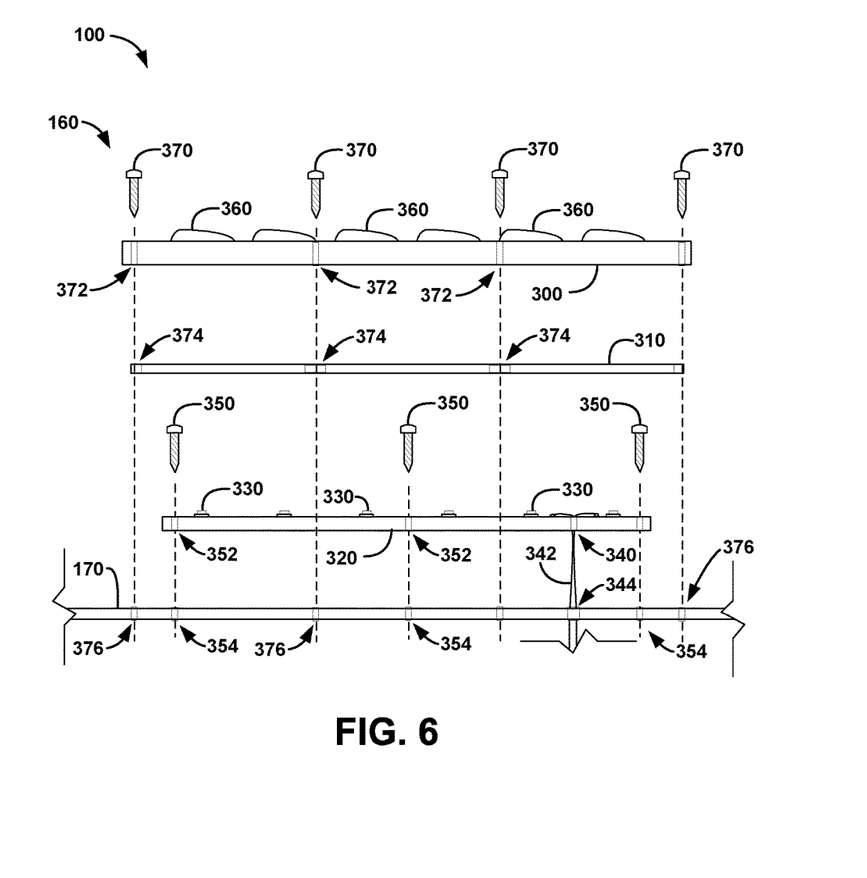
FIG. 6 shows an exploded view of the LED array module according to the preferred embodiment of FIG. 3.

FIG. 3 shows a plan view, illustrating an LED array module 160, according to the preferred embodiment of FIG. 2. FIG. 4 shows a plan view of an LED array 315 according to the preferred embodiment of FIG. 3. FIG. 5 shows a plan view of an LED array lens 300 according to the preferred embodiment of FIG. 3. FIG. 6 shows an exploded view of the LED array module 160 according to the preferred embodiment of FIG. 3.

LED array module 160 preferably comprises LED array lens 300, LED array 315 and at least one gasket 310, as shown. LED Array 315 preferably comprises at least one LED array board 320, multiple LEDs 330 (at least herein embodying wherein such at least one light-emitting-diode array comprises at least one light-emitting-diode structured and arranged to emit light when connected to power), and at least one set of power wires 342, as shown. LEDs 330 preferably are mounted on LED array board 320, as shown. LEDs 330 preferably are mounted, as shown, in at least one geometrical arrangement, preferably at least one rectangular arrangement, preferably in at least two rows, preferably in at least two rows of six. Upon reading the teachings of this specification, those with ordinary skill in the art will now appreciate that, under appropriate circumstances, considering such issues as cost, available materials, etc., other arrangements of LEDs, such as, for example, non-geometrical arrangements, circular arrangements, ovular arrangements, square arrangements, other quadrilateral arrangements, three dimensional arrangements, other polygonal arrangements, etc., may suffice.

LED array board 320 (at least embodying herein at least one circuit board structured and arranged to connect each such at least one light-emitting-diode to power) preferably comprises at least one circuit 335 coupling each LED 330 to both power wires 342, as shown. Power wires 342 preferably extend through at least one power wire hole 340 through LED array board 320 and through at least one power wire hole 344 through LED support 170, (see FIG. 6). Power wires 342 preferably comprise wiring 165, preferably connecting to power converter 180, as shown.

LED array board 320 is preferably mounted to LED support 170, as shown (at least herein embodying wherein such at least one circuit board mounts directly to such at least one support). At least one board-mount screw 350 preferably mounts LED array board 320 to LED support 170 using at least one board mount hole 352 and at least one board-mount hole 354, (see FIG. 6). LED array board 320 preferably is thermally connected to LED support 170, and preferably able to conduct heat to LED support 170, as shown. Thereby, LED support 170 preferably acts as a heat sink for the heat generated by LEDs 330 and circuit 335 of LED array board 320.

Gasket 310 preferably comprises at least one flexible material, preferably at least one rubberized material. Gasket 310 preferably is positioned to surround LED array board and sandwiched between LED array lens 300 and LED support 170, as shown. Gasket 310 preferably provides weather resistance to LED array module 160 (at least herein embodying wherein such at least one light-emitting-diode array further comprises at least one seal structured and arranged to seal at least one light-emitting-diode lens with such at least one support). Upon reading the teachings of this specification, those with ordinary skill in the art will now appreciate that, under appropriate circumstances, considering such issues as cost, available materials, etc., other weather-proofing, such as, for example, curing sealants, self sealing lens materials, additional coverings, etc., may suffice.

LED array lens 300 preferably comprises at least one LED lens 360, as shown. LED lens 360 preferably diffuses light from LED 330, as shown (at least one light-emitting-diode lens structured and arranged to direct light from such at least one light-emitting-diode). LED array lens 300 preferably further comprises at least one mount screw accommodator 356 (at least herein embodying wherein such at least one light-emitting-diode lens comprises at least one mount screw accommodator structured and arranged to accommodate clearance between such at least one circuit board and such at least one light-emitting-diode lens to allow at least one circuit board mount screw to protrude above such at least one circuit board). Mount screw accommodator 356 preferably comprises a space between material of LED array lens 300 and LED array board 320 over the position of board-mount screw 350, as shown. Mount screw accommodator 356 preferably provides clearance for head of board-mount screw 350 when LED array module 160 is assembled and mounted on LED support, as shown. LED array lens 300 further comprises at least one wire accommodator 346, as shown (at least herein embodying wherein such at least one light-emitting-diode lens comprises at least one wire accommodator structured and arranged to accommodate clearance space between such at least one circuit board and such at least one light-emitting-diode lens to allow at least one power wire to connect to such at least one circuit board). Wire accommodator 346 preferably comprises a space between material of LED array lens 300 and LED array board 320 over the position of wires 342, as shown. Wire accommodator 346 preferably provides clearance for wires 342 when LED array module 160 is assembled and mounted on LED support, as shown. LED array lens 300 further comprises at least one secondary mount screw accommodator 358, as shown. Secondary mount screw accommodator 358 is structured and functions similar to mount screw accommodator 356, however is preferably positioned over secondary locations for board-mount screws 350, should an alternate location for board-mount screws 350 be necessitated, as shown.

LED array lens 300 further comprises at least one mount reinforcement 378 and at least one lens mount hole 372, as shown. LED array lens 300 preferably mounts directly to LED support 170, as shown, (at least herein embodying wherein such at least one light-emitting-diode lens mounts directly to such at least one support) preferably with at least one lens screw 370 (See FIG. 6). At least one lens screw 370 preferably mounts LED array lens 300 to LED support 170 using at least one lens mount hole 372 and at least one lens mount hole 376, (see FIG. 6). LED array lens 300 and LED support 170 preferably enclose LED array board 320 (at least herein embodying wherein such at least one light-emitting-diode lens and such at least one support enclose such at least one circuit board and such at least one light-emitting-diode and seal together against weather). Gasket 310 preferably comprises at least one lens screw accommodator 374, as shown. Lens screw accommodator 374 preferably permits lens screw 370 to pass outside of gasket 310, as shown. Lens screw accommodator 374 preferably comprises at least one edge divit, as shown.

LED array lens 300 preferably comprises at least one transparent material. LED array lens 300 preferably comprises at least one rigid material. Upon reading the teachings of this specification, those with ordinary skill in the art will now appreciate that, under appropriate circumstances, considering such issues as cost, available materials, etc., other materials, such as, for example, semi-rigid materials, semi-transparent materials, etc., may suffice.

LED array lens 300 preferably comprises rotational positional symmetry, preferably 180 degree rotational positional symmetry, as shown. Rotational positional symmetry preferably permits LED array lens 300 to rotate 180 degrees and still accommodate the positions of LEDs 330, lens screws 370, wires 342 and board-mount screws 350, as shown. By permitting such rotation LED lens 360 may have a directional shape that permits the angle of direction to be used in at least two positions with respect to LED array 315, thus reducing the number of parts required to accommodate a range of lighting direction designs in LED retrofit system 100. Upon reading the teachings of this specification, those with ordinary skill in the art will now appreciate that, under appropriate circumstances, considering such issues as cost, available materials, etc., other symmetries, such as, for example, 30 degree symmetry, 90 degree symmetry, axial symmetry, etc., may suffice.

Figure 7:
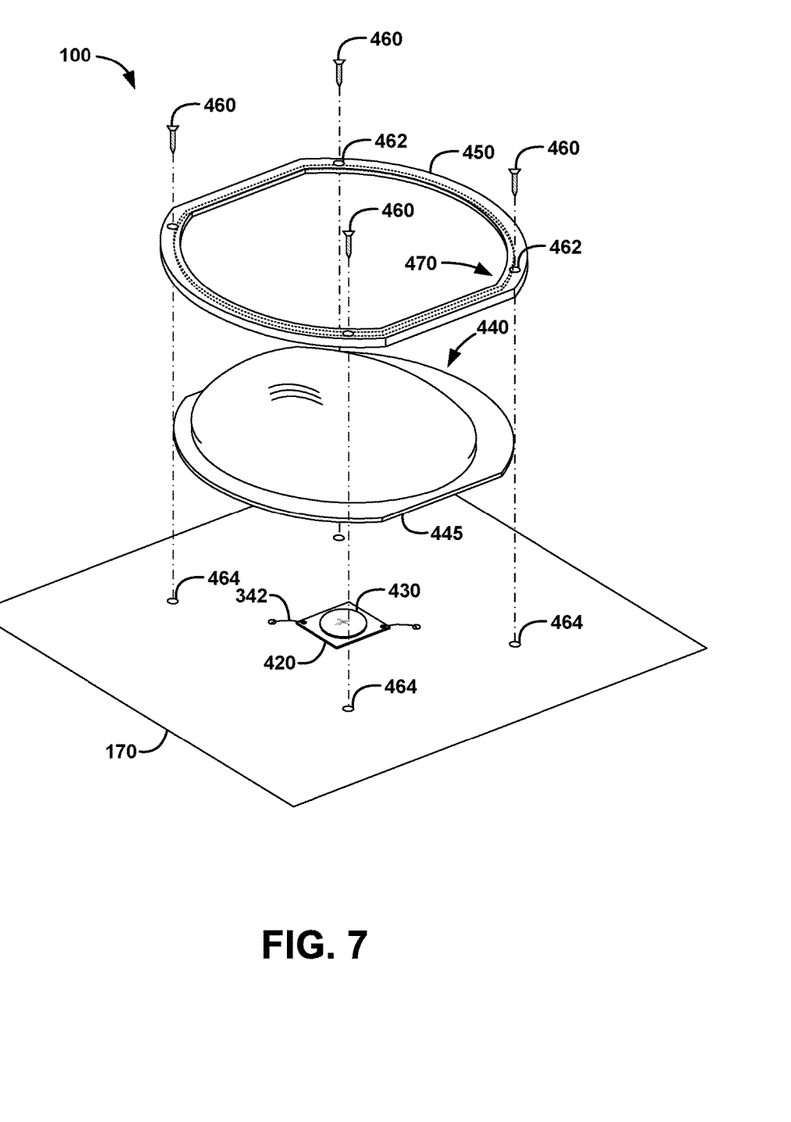
FIG. 7 shows an exploded view of another LED array module according to another preferred embodiment of the present invention.

FIG. 7 shows an exploded view of another LED array module 400 according to another preferred embodiment of the present invention. LED array module 400, preferably comprises at least one LED spot array 430, at least one lens 440, and at least one mounting ring 450, as shown. LED spot array 430 preferably is mounted on at least one LED board 420, as shown. LED board 420 preferably connects to wires 342 to provide power to LED spot array 430, as shown. LED spot array 430 preferably comprises an array of LEDs built into a single chip, as shown. LED spot array 430 may particularly be useful when lighting fixture enclosure 110 is small and more LEDs need to be compressed into a smaller area to obtain the light density sought in LED retrofit system 100, as shown.

Lens 440 preferably comprises at least one semi-rigid material. Lens 440 preferably comprises at least one transparent material. Lens 440 preferably comprises a dome shape, preferably to diffuse the light generated over a wider range of angles. Lens 440 preferably self-seals when mounted to resist weather. Mounting ring 450 preferably presses peripheral edge 445 of lens 440 into LED support 170, as shown.

Mounting ring 450 preferably comprises a groove 470 to fit around and over peripheral edge 445, as shown. Mounting ring preferably comprises at least one rigid material. Mounting ring preferably comprises at least one screw hole 462 and mounts to LED support using at least one mount screw 460.

FIG. 8 shows a diagrammatic view illustrating a retrofit method 500 of the high-intensity discharge (HID) lighting fixture of FIGS. 2A and 2B into the light-emitting diode (LED) lighting fixture of FIGS. 1A and 1B according to a preferred embodiment of the present invention.

LED retrofit system 100 preferably comprises retrofit method 500. Retrofit method 500 preferably retrofits HID lighting fixture 200 into LED lighting fixture 101. Retrofit method 500 preferably comprises the steps of design LED module 510, manufacture LED module 520, and retrofit lighting fixture 530.

In the step of design LED module 510, a design is derived from the size and mount-footprint of lighting fixture lens 210. Design LED module 510 preferably comprises the steps of identifying lighting fixture 512, determining measurements 514, and designing a layout 516.

In step Identifying lighting fixture 512, each size and shape of HID lighting fixture 200 designated in a retrofit job is identified (at least embodying herein identifying at least one high-intensity-discharge lighting fixture to be retrofitted with light-emitting-diode lighting modules; and at least herein embodying wherein such at least one high-intensity-discharge lighting fixture comprises at least one enclosure base and at least one enclosure lid structured and arranged to close together and seal against weather to protect components of at least one high-intensity-discharge lighting fixture, and at least one lens mount structured and arranged to mount at least one lens of such at least one high-intensity-discharge lighting fixture in such at least one enclosure lid). Applicant recognizes that some retrofit jobs may entail multiple sizes and shapes of HID lighting fixtures 200 slated for retrofit (at least herein embodying wherein the step of identifying at least one high-intensity-discharge lighting fixture comprises identifying multiple structural groupings of such at least one high-intensity-discharge lighting fixtures; and at least herein embodying wherein each group of such at least one high-intensity-discharge lighting fixtures requires a different design of such at least one layout). Ideally, after identifying each different lighting fixture, retrofitting proceeds in a sequenced fashion, preferably completing the step of design LED module 510 for each type of lighting fixture identified (at least herein embodying wherein the steps of measuring such at least one lens and at least one lens opening, and designing at least one layout comprise the step of creating such at least one layout), so that each type of lighting fixture may continue in steps manufacture LED module 520 (at least herein embodying wherein the steps of cutting at least one support, mounting such at least one light-emitting-diode array, and wiring such at least one light-emitting-diode array comprise the step of manufacturing the light-emitting-diode lighting modules), and retrofit lighting fixture 530 while subsequent types of lighting fixtures undergo the step of design LED module 510. Such a sequenced fashion preferably streamlines resource and personnel use in LED retrofit system 100 (at least herein embodying wherein the steps of creating such at least one layout, manufacturing the light-emitting-diode lighting modules and installing the light-emitting-diode lighting modules process steps on each group of such at least one high-intensity-discharge lighting fixtures in stages, so that preceding step processes a next group while a following step processes a group previously completed by the preceding step; and at least herein embodying whereby each group is not processed through each of the steps of creating, manufacturing, and installing before the next group begins processing).

In step determining measurements 514, lighting fixture lens 210 and opening 125 are used to determine the base design measurements (at least embodying herein measuring such at least one lens and at least one lens opening of at least one high-intensity-discharge lighting fixture). In a most preferred implementation, lighting fixture lens 210 is removed temporarily from HID lighting fixture 200 and the footprint is traced as a template measurement for the base size of LED support 170. Likewise, measurement and positioning of opening 125 is ascertained giving the available space to arrange LED array modules 160. As an alternative, additional measurements are taken of the mount points of HID components 220, as alternative mount points for power converter 180.

In step designing a layout 516, the measurements obtained in step determining measurements 514 are utilized with lighting parameters to design the layout of LED lighting module 150 (at least embodying herein designing at least one layout of at least one light-emitting-diode array to fit within measured size of such at least one lens opening). The lighting parameters preferably comprise desired light intensity, focus/dispersion, and direction with respect to lighting fixture lens 210 (at least herein embodying the step of ascertaining at least one lighting requirement; and at least herein embodying wherein the step of designing at least one layout incorporates such at least one lighting requirement). In addition to the general layout of LED lighting module 150, selection of the size, shape, number, and lenses of LED array module 160 are determined. Design of the layout also preferably comprises the positions and mount points of power converter 180. Once a layout is completed, the layout is utilized in step manufacture LED module 520.

In step manufacture LED module 520, a requisite number of LED lighting modules 150 following the layout designed in step design LED module 510 are manufactured. Manufacture LED module 520 preferably comprises the steps of assemble LED module 522, wire LED module 524, and stock LED modules 526.

In step assemble LED module 522, LED support 170 is preferably cut to size and holes are drilled for board-mount holes 354, lens mount holes 372, and power wire holes 340 according to the layout designed (at least herein embodying cutting at least one support to match the size of such at least one lens; and at least herein embodying wherein, once cut such at least one support is capable of mounting to such at least one enclosure lid using such at least one lens mount). Next, LED array modules 160 are mounted to LED support 170 (at least herein embodying mounting such at least one light-emitting-diode array to such at least one support following the design of such at least one layout; and at least herein embodying wherein the step of mounting such at least one light-emitting-diode array comprises the steps of mounting at least one circuit board having at least one light-emitting-diode directly to such at least one support; and at least herein embodying mounting at least one light-emitting-diode lens directly to such at least one support; and at least herein embodying wherein the step of mounting such at least one light-emitting-diode lens comprises the steps of enclosing such at least one circuit board and such at least one light-emitting-diode with such at least one light-emitting-diode lens and such at least one support; and at least herein embodying sealing such at least one light-emitting-diode lens with such at least one support against weather).

In step wire LED module 524, LED array module 160 is preferably wired to connect with power converter 180 (at least embodying herein wiring such at least one light-emitting-diode array to connect with at least one power converter structured and arranged to convert power from at least one input power of such at least one high-intensity-discharge lighting fixture to power requirements of such at least one light-emitting-diode array). In a preferred embodiment, power converter 180 is mounted to LED support 170 and directly wired into wiring 165 (at least herein embodying mounting such at least one power converter to such at least one support; and at least herein embodying mounting such at least one power converter to such at least one enclosure base). In an alternately preferred embodiment, wiring 165 is arranged to readily connect to power converter 180 at the time of installation, preferably in a wiring harness, preferably in a plug in wiring harness.

In step stock LED modules 526, a stock of assembled LED array modules 160 is created until sufficient LED array modules 160 are in stock to begin installation processes. In an optimized operation, installation processes for previously stocked LED array modules 160 proceeds while stock accumulates for the next installation process.

In step retrofit lighting fixture 530, each HID lighting fixture 200 designated for retrofit is altered by removing HID components 220 and installing LED lighting module 150 (at least herein embodying disconnecting and removing components of such at least one high-intensity-discharge lighting fixture). Retrofit lighting fixture 530 preferably comprises the steps of remove non-reusable components 532, install LED module 534, and complete retrofit 536. All steps of retrofit lighting fixture 530 preferably happen in situ, permitting minimal downtime of lighting fixtures during the retrofit process. Since LED lighting modules 150 are preassembled, the bulk of the downtime of lighting fixtures occurs in removing the existing non-reusable equipment contained in HID lighting fixture 200.

In step remove non-reusable components 532, Power is disconnected from HID lighting fixture 200 and HID components are removed from lighting fixture enclosure 110 (at least herein embodying recycling such at least one components of such at least one high-intensity-discharge lighting fixture removed in the step of disconnecting and removing components; and at least herein embodying wherein the step of disconnecting and removing components comprises the step of removing such at least one lens). Lighting fixture lens 210 is preferably also removed from lighting fixture enclosure 110. In an alternately preferred embodiment, where maintaining the appearance of lighting fixtures is required Lighting fixture lens 210 is left in place, LED lighting module 150 preferably having been designed to accommodate lighting fixture lens 210. Preferably, all components removed from HID lighting fixture 200 are recycled appropriate to their materials, preferably reducing the overall cost of retrofitting.

In step install LED module 534, LED lighting module 150 is mounted using mount 175 (at least herein embodying mounting such at least one support to such at least one enclosure lid with such at least one lens mount). Likewise, if power converter 180 is not already mounted to LED support 170, power converter 180 is mounted in the mount location according to the layout designed and connected to wiring 165 (at least herein embodying connecting power to such at least one light-emitting-diode array through such at least one power converter from at least one input power of such at least one high-intensity-discharge lighting fixture). Next, wiring 182 is connected, preferably to enable power to power converter 180.

In step complete retrofit 536, power is restored and LED lighting fixture 101 is preferably tested. Additionally, lighting fixture enclosure 110 is closed up and ready for normal operation (at least embodying herein closing such at least one enclosure lid with such at least one enclosure base; and at least herein embodying wherein such at least one high-intensity-discharge lighting fixture is retrofitted to become at least one light-emitting-diode lighting fixture).

Retrofitting of an existing HID light fixture with LED lights allows for customization of the dispersion of light such that a more efficient, brighter array of light can illuminate an area with lower heat production, energy usage and reduced overall operational and maintenance costs.

With this method an efficient, cost effective and simple chain of steps can be created such that a large number of HID fixtures can be replaced reasonably quickly. Once the user measures the size of LED support 170 a large set of LED supports 170 can be cut, manufactured with power converter 180 and LED arrays modules 160, and installed fairly quickly. The process can be done in stages such that once the first set of LED supports 170 have been designed, cut and passed on to the manufacturing group, the next set can be cut, and so on. Likewise, the manufacturing group can stage sets of LED lighting modules 150 completing assembly then passing a set onto the installing group while assembling the next set.

Although applicant has described applicant's preferred embodiments of this invention, it will be understood that the broadest scope of this invention includes modifications such as diverse shapes, sizes, and materials. Such scope is limited only by the below claims as read in connection with the above specification.

What is claimed is:

1. A light emitting diode (LED) assembly for retrofitting a lamp housing of the type including a downwardly facing lid having a window bounded by a window frame and configured to removably enclose the housing, the LED assembly comprising;
- a support having respective upwardly facing and a downwardly facing surfaces defining a heat sink plane spanning the window;
- an circuit board having a first perimeter, a bottom surface to which a plurality of LEDs are mounted, and a top surface, where the circuit board is mounted to the support such that the top surface of the circuit board directly bears against the downwardly facing surface of the support;
- a lens array having a second perimeter, the lens array mounted directly to the downwardly facing surface of the support such that the first perimeter is disposed entirely within the second perimeter;
- an offset mount connected to the upwardly facing surface of the support, the offset mount including a local heat sink surface spaced apart from the support; and
- a power converter mounted to the local heat sink surface, the power converter including a conductor extending through the support and connected to the circuit board;
- wherein the support includes a heat sink perimeter region which extends outwardly along the heat sink plane beyond the first and second perimeters to thereby draw thermal energy laterally away from the LEDs to the heat sink perimeter region; and
- an outer portion of the heat sink perimeter region is disposed inside the lid and connected to the window frame.

2. The LED assembly of claim 1, further comprising a gasket disposed between the lens array and the support.

3. The LED assembly of claim 1, wherein the support includes a first set of holes configured to facilitate mounting the circuit board to the support, and a second set of holes configured to facilitate mounting the lens array to the support, wherein the first and second sets of holes are substantially mutually exclusive.

4. The LED assembly of claim 1, wherein the circuit board is substantially planar.

5. The LED assembly of claim 1, wherein the lens array is substantially planar.

6. The LED assembly of claim 1, wherein the support is substantially rectangular.

7. The LED assembly of claim 1, wherein the circuit board is substantially rectangular.

8. The LED assembly of claim 1, wherein the lens array is substantially rectangular.

9. The LED assembly of claim 1, wherein the conductor extends through the support from the upwardly facing surface to the downwardly facing surface thereof.

10. The LED assembly of claim 1, further comprising a plurality of circuit boards each having a board perimeter, a bottom surface to which a plurality of LEDs are mounted, and a top surface, where each of the plurality of circuit boards is mounted to the support such that the top surface of each circuit board directly bears against the downwardly facing surface of the support.

11. The LED assembly of claim 10, wherein the support includes a heat sink perimeter region which extends outwardly along the heat sink plane beyond each of the board perimeters to thereby draw thermal energy laterally away from the LEDs to the heat sink perimeter region.

* * * * *